United States Patent Office 3,547,940
Patented Dec. 15, 1970

3,547,940
SUBSTITUTED UREIDO ISOXAZOLES
Richard K. Brantley, Wilmington, Del., assignor to E. I. du Pont de Nemours and Company, Wilmington, Del., a corporation of Delaware
No Drawing. Filed Oct. 31, 1967, Ser. No. 679,565
Int. Cl. C07d 85/22
U.S. Cl. 260—307          7 Claims

ABSTRACT OF THE DISCLOSURE

Substituted ureidoisoxazoles such as 4-bromo-3-methyl-5-(3-phenylureido)isoxazole are prepared by reacting a 5-aminoisoxazole, with an appropriate isocyanate or di-alkylcarbamyl halide, in the presence of an inert solvent and ordinarily a catalyst such as a tertiary amine, at a temperature between 0° and 150° C., followed by further substitution on the isoxazole ring or the urea as desired. The resulting ureido isoxazoles are useful in controlling unwanted vegetation in the locus of crops, turf and nursery stock.

BACKGROUND OF THE INVENTION

This invention relates to isoxazoles and more particularly is directed to substituted ureidoisoxazoles and to their use as herbicides.

There is a continuing need in agriculture for effective herbicides both for broad spectrum and selective use. A particular agricultural problem is the removal of broad leaf and grassy weeds from crops, nursery stock and turf. For example it is very unusual for a chemical to control such weeds as chickweed *Stellaria media*, with safety to turf grasses such as annual bluegrass *Poa annua*.

I have discovered that some substituted ureidoisoxazoles will remove chickweed and other grassy and broadleaved weeds from crops, nursery stock and turf without causing injury to the turf, crops and nursery stock when used as described hereinafter. Moreover the ureidoisoxazoles of this invention are useful in protecting lawns, crop plants and nursery stock from such grassy and broadleaved weeds as mustard *Brassico* spp., ragweed *Ambrosia elation*, teaweed *Sida* spp., velvetleaf *Abutilon theophrasti*, pigweed *Amaranthus retroflexus*, and yellow rocket *Barbarea vulgaris*. Some compounds of this invention are also effective in controlling goosegrass *Eluesine indica*, foxtail *Setaria* sp. and Johnsongrass *Sorghum halepense*, growing from seed.

SUMMARY OF THE INVENTION

In summary, this invention is directed to ureidoisoxazoles of the formula (1) 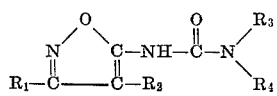

wherein $R_1$ is methyl or ethyl;
$R_2$ is hydrogen, chlorine, bromine or methyl;
$R_3$ is hydrogen or alkyl of 1 through 3 carbon atoms; and
$R_4$ is alkyl of 1 through 3 carbon atoms; unsubstituted cyclohexyl, cyclohexyl substituted with chlorine or methyl, or

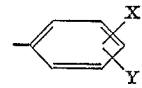

wherein

X is hydrogen, fluorine, chlorine, bromine or methyl; and
Y is hydrogen, chlorine or $NO_2$;

with the proviso that when $R_4$ is aryl, $R_3$ must be hydrogen, and to the use of these compounds in controlling unwanted vegetation in turf, crops and nursery stock.

DESCRIPTION OF THE INVENTION

*Preparation.*—The ureidoisoxazoles of Formula 1 can be prepared generally by reacting a 5-aminoisoxazole with an isocyanate in an inert solvent at a temperature of from 0° C. to 150° C., optionally but preferably in the presence of a catalyst such as a tertiary amine. Such a reaction can ordinarily be completed in from a few minutes to 24 hours.

If a compound of Formula 1 is desired which is substituted in both the $R_3$ and $R_4$ positions it is convenient to prepare the compound using the correspondingly substituted carbamyl halide instead of an isocyanate. Such a reaction will ordinarily be carried out in the presence of an acid acceptor, such as a tertiary amine, to trap the hydrogen halide which is formed during reaction.

Alternatively the compounds of Formula 1 may be prepared by converting an aminoisoxazole to the corresponding isoxazole isocyanate by reaction with phosgene, and subsequently reacting the product with an appropriate amine to give the desired ureidoisoxazole.

Compounds of Formula 1 which contains a halogen in the 4-position of the isoxazole ring can be prepared by halogenation of the isoxazole ring with a halogenating agent such as bromine, chlorine or sulfuryl chloride. Halogenation can be carried out before or after preparation of the urea. Halogenation is ordinarily carried out at a temperature of 0° to 50° C., in the presence of an inert solvent and an acid acceptor. Representative of suitable solvents for bromination with elemental bromine are acetic acid and water. A suitable acid acceptor is sodium acetate.

Chlorination of the isoxazole ring is preferably carried out at a temperature of from 0 to 100° C. after the urea has been formed. If sulfuryl chloride is used as the halogenating agent, it is preferred to carry out the halogenation in an inert chlorinated hydrocarbon solvent. If elemental chlorine is used, it is preferred to carry out the halogenation in a polar solvent in the presence of an acid acceptor.

*Activity.*—As stated previously, the compounds of Formula 1 are active herbicides useful for controlling a variety of unwanted vegetation in the locus of a number of crop plants, such as tomatoes, cotton and tobacco as well as in nurseries and in turf grasses. Thus the compounds of Formula 1 can be used to control such broadleaf and grassy weeds as common chickweed, crabgrass, foxtail, goosegrass, yellow rocket, pigweed, velvetleaf, teaweed, ragweed, and mustard.

Compounds of Formula 1 in which $R_4$ is aryl or substituted aryl and $R_3$ hydrogen are preferred compounds of this invention. These compounds are preferred because of their herbicidal activity at economically low rates.

The most preferred compounds of Formula 1 because of their exceptional activity against such weeds as chickweed coupled with good tolerance for desirable plants are;

3-methyl-5-(3-phenylureido)isoxazole,
4-bromo-3-methyl-5-(3-phenylureido)isoxazole,
4 - bromo - 3-methyl-5-[3-(o-fluorophenyl)ureido]isoxazole,
4 - chloro-3-methyl - 5 - [3-(o-fluorophenyl)ureido]isoxazole, and
4-chloro-3-methyl-5-(3-phenylureido)isoxazole.

Of these compounds, two can be mixed with lawn grass seeds at the time of seeding to control chickweed. These particularly useful compounds are:

4-bromo-3-methyl-5-(3-phenylureido)isoxazole, and
4-chloro-3-methyl-5-(3-phenylureido)isoxazole.

*Formulation.*—Herbicidal formulations of this invention can be prepared by admixing at least one compound of Formula 1 with pest control adjuvants or modifiers to provide compositions in the form of dusts, granules, pellets, water-dispersible powders, high-strength concentrates, aqueous dispersions or emulsions and solutions or dispersions in organic liquids.

Such formulations can be prepared in the manner described in Gerjovich U.S. Pat. No. 3,287,467 issued Nov. 22, 1966, the disclosure of which is hereby incorporated by reference.

In addition to the surface active agents, extenders, diluents, carriers, solvents, grinding aids, anti-forming agents, corrosion inhibitors, modifiers and dispersing agents disclosed in the above patent as suitable formulating ingredients, the compounds of Formula 1 can often also be mixed with desiccants, buffering agents, bactericides, fungicides, insecticides, nematocides, acaricides, bacteriostats, fungistats, fertilizers, and other herbicides to advantage.

Particularly useful combinations are mixtures of one or more compounds of Formula 1 with $\alpha,\alpha,\alpha$-trifluoro-2,6-dinitro - N,N - dipropyl-p-toluidine; dimethyl-2,3,5,6-tetrachloroterephthalate; 2 - chloro - N - isopropyl acetanilide; N - (2 - mercaptoethyl)benzenesulfonamide; 2,4-dichlorophenoxyacetic acid; and 1-(2-methylcyclohexyl)-3-phenylurea, for use in controlling a wide range of undesirable vegetation.

*Application.*—The compounds of Formula 1 can be applied by any of the many means well known to the art. Ordinarily the compounds will be applied in the form of a wettable powder or solution formulation as described above. The active ingredient is applied in a sufficient concentration and amount to exert the desired herbicidal activity. Application can be made directly upon the area to be protected and the vegetation during the period of infestion by post- or pre-emergence techniques.

The rates of application will of course vary depending upon the particular active ingredient employed, the nature of the formulation used, the type of treatment, the type of vegetation to be controlled and protected, the time of the year, the climate and the like. In general the compounds of Formula 1 are applied at rates ranging from 1 to 20 kilograms per hectare.

The following examples further illustrate the invention. Reference to parts or percentages in the following examples are by weight unless otherwise specified.

EXAMPLE 1

Three and two-tenths parts of 5-amino-3-ethyl-4-methylisoxazole is dissolved in 50 parts of benzene, and 3.4 parts of o-fluorophenyl isocyanate, and 0.5 part of triethylamine is added to the above solution. The resulting mixture is boiled at reflux for 1 hour, then cooled and the solvent removed under vacuum. The solid residue is purified by recrystallization from ethanol to yield 2.8 parts of pure 5 - [3 - (o-fluorophenyl)ureido]-3-ethyl-4-methylisoxazole melting point 186–189.5° C.

EXAMPLE 2

Four and seven-tenths parts of 3,4-dichlorophenyl isocyanate is substituted for the o-fluorophenyl isocyanate in Example 1. The resulting 5-[3-(3,4-dichlorophenyl)-ureido]-3-ethyl-4-methylisoxazole melts at 183–185° C.

EXAMPLE 3

Three and five-tenths parts of m-tolyl isocyanate is substituted for the o-fluorophenyl isocyanate in Example 1. The resulting 5 - (3-m-tolylureido)-3-ethyl-4-methylisoxazole melts at 170.5–172° C.

EXAMPLE 4

Ten parts of 5-amino-3-methylisoxazole is dissolved in a solution of 9 parts sodium acetate in 100 parts acetic acid. Sixteen parts of bromine is slowly added to the above stirred mixture at room temperature. After the addition is complete, the mixture is stirred for a short time and is then poured into 300 parts of ice-water. This mixture is adjusted to a pH of 8 with ammonium hydroxide and then extracted with methylene chloride. The extract is dried with anhydrous magnesium sulfate, filtered, and the solvent evaporated. The residue is purified by recrystalization from a mixture of benezene and hexane to yield essentially pure 5-amino-4-bromo-3-methylisoxazole, melting point 67–69° C.

EXAMPLE 5

Seventeen and seven-tenths parts of 5-amino-4-bromo-3-methylisoxazole is mixed with 12 parts of phenyl isocyanate. The mixture is warmed and stirred until homogenous and is then permitted to stand at room temperature overnight. The next morning the solids present are purified by recrystalization from ethanol. The product, 5-(3-phenyluredo)-4-bromo-3-methylisoxazole, melts at 189–193° C.

EXAMPLE 6

Substitution of an equimolar amount of cyclohexyl isocyanate for the phenyl isocyanate of Example 5 results in the formation of 4-bromo-5-(3-cyclohexylureido)-3-methylisoxazole, melting point 143–146° C.

EXAMPLE 7

Substitution of an equimolar amount of 5-amino-3-methylisoxazole for the 5-amino-4-bromo-3-methylisoxazole of Example 5 results in the formation of 3-methyl-5-(3-phenylureido)isoxazole. This material can be purified from benzene and melts at 146–149 °C.

EXAMPLE 8

Twenty-one and eight-tenths parts of 3-methyl-5-(3-phenylureido)isoxazole, as prepared in the previous Example, is added to a solution of 100 parts methylene chloride and 14 parts sulfuryl chloride. This mixture is boiled at reflux for two hours, cooled, and the solids collected. Recrystallization from ethanol gives essentially pure 4-chloro-3-methyl-5-(3-phenylureido)isoxazole. Upon heating the material decomposes slowly to 192° C., where melting is complete.

EXAMPLE 9

Substitution of an equimolar amount 3-methyl-5-(3-methylureido)isoxazole for the 3-methyl-5-(3-phenylureido)isoxazole of the previous example results in the formation of 4 - chloro - 3-methyl-5-(3-methylureido)isoxazole, melting point 150–151° C.

EXAMPLE 10

Nine and eight-tenths parts of 5-amino-3-methylisoxazole is dissolved in a mixture of 50 parts benzene and 50 parts tetrahydrofuran. Ten and seven-tenths parts of N,N-dimethylcarbamyl chloride is added to the mixture followed by 10.5 parts of triethylamine. This mixture is boiled at reflux for one hour. The solvent is then evaporated at reduced pressure and 3-methyl-5-(3,3-dimethylureido)isoxazole is recovered from the residue.

EXAMPLE 11

Substitution of an equimolar amount of N,N-dipropylcarbamyl chloride for the N,N-dimethylcarbamyl chloride of the previous example results in the formation of 3-methyl-5-(3,3-dipropylureido)isoxazole.

EXAMPLE 12

Sixteen and four-tenths parts of p-nitrophenyl isocyanate and 16.3 parts of 5-amino-4-bromo-3-methylisoxazole are dissolved in a mixture of 100 parts benzene and 100 parts tetrahydrofuran. Two parts of triethylamine are added and the mixture is boiled at reflux for 2 hours. The solvent is then evaporate, and the residue purified, preferably by recrystallization. The 4-bromo-3-methyl-5-[3-(p-nitrophenyl)ureido]isoxazole product melts at 192–194° C.

EXAMPLE 13

Substitution of 15.3 parts of p-chlorophenyl isocyanate for the p-nitrophenyl isocyanate in Example 12 yields 4-bromo-5-[3-(p-chlorophenyl)ureido] - 3 - methylisoxazole, M.P. 188—190° C.

EXAMPLE 14

Substitution of 19.8 parts of p-bromophenyl isocyanate for the p-nitrophenyl isocyanate of Example 12 yields 4-bromo-5-[3-(p-bromophenyl)ureido] - 3 - methylisoxazole.

EXAMPLE 15

Substitution of an equimolar amount of 4-chlorocyclohexyl isocyanate for the p-nitrophenyl isocyanate of Example 12 results in 4-bromo-5-[3-(4-chlorocyclohexyl)-ureido]-3-methylisoxazole.

EXAMPLE 16

Substitution of an equivalent amount of 2-methylcyclohexyl isocyanate for the p-nitorphenyl isocyanate of Example 12 results in the formation of 4-bromo-5-[3-(2-methylcyclohexyl)ureido]-3-methylisoxazole.

EXAMPLE 17

| | Percent |
|---|---|
| 4-bromo-3-methyl-5(3-phenylureido)isoxazole | 50.0 |
| Kaolinite | 46.0 |
| Partially desulfonated sodium ligninsulfonate | 2.0 |
| Dioctyl sodium sulfosuccinate | 2.0 |

The above ingredients are blended, mikropulverized to a particle size below 100 microns and reblended.

The above composition is diluted with water at the rate of one kilogram of active ingredient per 1600 liters of water and is thoroughly agitated. The resultant spray suspension is evenly distributed over a 1 hectare plot of freshly seeded Kentucky bluegrass, Poa pratensis. The treatment results in excellent control of chickweed, Stellaria media, enabling the bluegrass to grow to a thick stand.

Four kilograms of the above formulation and eight kilograms of a 50% wettable powder formulation of 1-(2-methylcyclohexyl)-3-phenylurea are suspended in 250 liters of water and sprayed pre-emergence over .4 hectare of newly seeded Kentucky bluegrass. This treatment gives control of chickweed; crabgrass, Digitaria spp.; foxtail, Seatria spp. and barnyardgrass, Echinochloa crusgalli. The bluegrass germinates and rapidly develops into a thick stand.

Other compounds of Formula 1, such as 4-chloro-3-methyl-5-(3-phenylureido)isoxazole and 4-bromo-3-methyl-5-[3-(p-chlorophenyl)ureido]isoxazole, can be formulated and applied in the manner described above with similar results.

EXAMPLE 18

| | Percent |
|---|---|
| 3-methyl-5-(3-phenylureido)isoxazole | 25.0 |
| Attapulgite clay | 72.5 |
| Dioctyl sodium sulfosuccinate | 1.0 |
| Sodium lignin sulfonate | 1.5 |

The above ingredients are blended, ground to a particle size essentially below 50 microns and reblended.

Thirty-two kilograms of the above composition, uniformly suspended in 300 liters of water, are applied pre-emergence to a newly planted hectare of soybeans. This treatment provides excellent control of red-root pigweed, Amaranthus retroflexus, without causing visible injury to the soybean crop.

All of the compounds of the invention can be formulated in like manner.

EXAMPLE 19

| | Percent |
|---|---|
| 4 - bromo - 5 - [3-(p-chlorophenyl)ureido]-3-methylisoxazole | 99 |
| Trimethylnonyl polyethylene glycol ether | 1 |

The surfactant is sprayed on the active ingredient which is tumbled in a blender. The resulting high-strength composition is ground to pass a 0.59 mm. screen. It is suitable for further formulation but can also be applied directly.

The composition described above when applied by helicopter at the rate of 20 kilograms per hectare to a field of recently planted cotton results in complete control of the teaweed, Sida spp., and has no apparent adverse effect on the crop.

EXAMPLE 20

| | Percent |
|---|---|
| 4 - bromo - 5 - [3-(o-fluorophenyl)ureido]-3methylisoxazole | 30.0 |
| Calcium-magnesium lignin sulfonate plus wood sugars | 15.0 |
| Hydrated attapulgite | 2.0 |
| Sodium carbonate | 1.0 |
| Dioctyl sodium sulfosuccinate | 0.5 |
| Water | 51.5 |

The above solid ingredients are ground to pass a 0.84 mm. screen. The water is then added and the composition is sand-ground to a particle size below 5 microns. The suspension obtained by adding the sand-ground composition to water can be applied with little or no agitation.

The above sand-ground composition is extended with water at the rate of 5 kilograms of active ingredient per 250 liters of water. The resulting suspension is applied pre-emergence to a one hectare plot of field corn. The treatment gives excellent control of velvetleaf, Abutilon theophrasti, without causing injury to the corn.

EXAMPLE 21

| | Percent |
|---|---|
| 4-bromo - 3 - methyl - 5 - [3-(p-nitrophenyl)ureido]isoxazole | 5.0 |
| Attapulgite clay | 10.0 |
| Sodium benzene sulfonate | 0.5 |
| Talc | 84.5 |

All the above ingredients except the talc are blended and mikropulverized to a particle size essentially below 50 microns. This concentrate is then blended thoroughly with the talc to produce the final dust composition.

The composition is applied pre-emergence at the rate of 250 kilograms per hectare to a field of Irish potatoes. Good control of chickweed is obtained and the potatoes are harvested in high yields.

EXAMPLE 22

| | Percent |
|---|---|
| 4 - bromo - 5 - (3 - cyclohexylureido)-3-methylisoxazole | 15.0 |
| Isophorone | 79.0 |

EXAMPLE 22—Continued

| | Percent |
|---|---|
| Alkylphenyl polyethylene glycol ether | 3.0 |
| Oil soluble calcium alkylbenzene sulfonate | 3.0 |

The above ingredients are warmed with stirring to form an emulsifiable concentrate.

The concentrate is emulsified in water at the rate of 5 kilograms of active ingredient per 350 liters of water. The resultant emulsion is applied pre-emergence to a one-hectare evergreen nursery. Very satisfactory growth of the evergreens is obtained along with complete control of crabgrass and goosegrass, *Eluesine indica*, by means of the chemical treatment.

EXAMPLE 23

| | Percent |
|---|---|
| 3-methyl-5-(3-methylureido)isoxazole | 10.0 |
| Kaolinite | 33.5 |
| Sub-bentonite | 33.5 |
| Sodium sulfate (anhyd.) | 10.0 |
| Calcium lignin sulfonate plus wood sugars | 12.0 |
| Sodium alkyl naphthalene sulfonate | 1.0 |

The above components are blended and mikropulverized to a wettable powder with a particle size essentially below 100 microns. This powder is mixed with 18–20% water, is then extruded through a ⅛ inch die, is cut to size and the resulting pellets are then dried. The pellets can be applied directly or further sub-divided to granules.

The following compounds can be formulated in like manner to form herbicidal pellets.

4-bromo-3-methyl-5-(3-methylureido)isoxazole
3-ethyl-4-methyl-5-(3-phenylureido)isoxazole
3-ethyl-4-methyl-5-(3-methylureido)isoxazole
4-bromo-3-methyl-5-(3-phenylureido)isoxazole
3-methyl-5-(3-phenylureido)isoxazole

EXAMPLE 24

| | Percent |
|---|---|
| 3-methyl-5-(3-methylureido)isoxazole | 5.0 |
| Granular attapulgite (16–30 mesh) | 95.0 |

The active component is dissolved in methanol and the methanol solution is then sprayed on the granules which are tumbled in a mixer, followed by evaporation of the solvent.

The resulting granules are applied pre-emergence at the rate of 10 kilograms of active ingredient per hectare to a plot of field corn. This treatment provides complete control of crabgrass without injuring the crop.

EXAMPLE 25

| | Percent |
|---|---|
| 4 - bromo - 3 - methyl-5-[3-(o-fluorophenyl)ureido]-isoxazole | 80 |
| Montmorrillonite clay | 15 |
| Finely-divided synthetic silica | 2 |
| Sodium alkyl naphthalene sulfonate | 2 |
| Sodium lignin sulfonate | 1 |

The above ingredients are blended, mikropulverized to a particle size below 50 microns and reblended. Two kilograms of 4-bromo-3-methyl-5-[3-o-fluorophenyl)ureido]-isoxazole, as formulated above, is suspended in 300 liters of water and sprayed on a hectare of tobacco land which has been freshly prepared and bedded ready for transplanting the crop. The plants are set by punching holes, dropping in the roots, and pressing the soil around them. In this manner the chemical layer on the soil surface is disturbed the least. Three days after planting, the tobacco is irrigated. The chemical treatment provides control of ragweed, *Ambrosia elation*, teaweed, goosegrass and pigweed while the tobacco grows well.

EXAMPLE 26

A sufficient amount of the formulation of Example 25 to provide two kilograms of active ingredient are suspended in 200 liters of water and sprayed on a hectare of direct seeded tomatoes immediately after planting. This treatment provides control of pigweed, mustard Brassica spp., velvetleaf, goosegrass, foxtail and ragweed. The tomatoes produce an excellent yield.

EXAMPLE 27

Four kilograms of the active ingredient formulated as described in Example 25 are suspended in 400 liters of water and applied pre-emergence to a hectare of cotton. This treatment provides control of velvetleaf, teaweed, ragweed, goosegrass, and seedling Johnsongrass, *Sorghum halepense*.

EXAMPLE 28

One and one-half kilograms of 4-bromo-3-methyl-5-[3-(o-fluorophenyl)ureido]isoxazole as formulated in Example 25, and four kilograms of 1-(2-methylcyclohexyl)-3-phenylurea in the form of a wettable powder, are tank-mixed in 400 liters of water and applied pre-emergence to a hectare of snap beans. The treatment provides control of many broad-leaved and grass weeds including ragweed, pigweed, foxtail, crabgrass, barnyardgrass, goosegrass, velvetleaf and mustard. The beans grow well and produce an excellent yield.

EXAMPLE 29

| | Percent |
|---|---|
| 4 - chloro - 3 - methyl-5-[3-(o-fluorophenyl)ureido]-isoxazole | 80 |
| Attapulgite clay | 16 |
| Finely-divided synthetic silica | 2 |
| Dioctyl sodium sulfosuccinate | 1 |
| Methylated cellulose | 1 |

The above ingredients are blended, mikropulverized to a particle size below 50 microns and reblended. Two kilograms of 4-chloro-3-methyl-5-[3-(o-fluorophenyl)ureido]-isoxazole as formulated above, and five kilograms of dimethyl-2,3,5,6-tetrachloroterephthalate in the form of a wettable powder, are tank-mixed in 300 liters of water and sprayed pre-emergency on a hectare of direct-seeded tomatoes. This treatment provides extended control of many grasses broadleaved weeds including crabgrass, goosegrass, barnyardgrass, foxtail, ragweed, velvetleaf, teaweed, pigweed, mustard and yellow rocket, *Barbarea vulgaris*. The field provides an excellent yield of tomatoes.

What is claimed is:

1. The compounds of the formula $$R_1-C\underset{\underset{\displaystyle C-R_2}{\|}}{\overset{\displaystyle N}{\|}}\overset{O}{\diagdown}C-NH-\overset{O}{\underset{\|}{C}}-N\diagup\overset{R_3}{\diagdown}{R_4}$$

wherein $R_1$ is methyl or ethyl;
$R_2$ is hydrogen, chlorine, bromine or methyl;
$R_3$ is hydrogen or alkyl of 1 through 3 carbon atoms; and
$R_4$ is alkyl of 1 through 3 carbon atoms, unsubstituted cyclohexyl, cyclohexyl substituted with a substituent selected from the group consisting of chloro and methyl, or (phenyl ring with substituents X and Y)

wherein

X is hydrogen, fluorine, chlorine, bromine or methyl; and
Y is hydrogen, chlorine or $NO_2$;

with the limitation that when $R_4$ is aryl, $R_3$ must be hydrogen.

2. Compounds of Claim 1 in which the $R_3$ substituent is hydrogen and the $R_4$ substituent is (phenyl ring with substituents X and Y)

wherein

X is hydrogen, fluorine, chlorine, bromine or methyl; and
Y is hydrogen, chlorine or $NO_2$.

3. 3-methyl-5-(3-phenylureido)isoxazole.
4. 4-bromo-3-methyl-5-(3-phenylureido)isoxazole.
5. 4-bromo-3-methyl-5-[3-(o-fluorophenyl)ureido]-isoxazole.
6. 4-chloro-3-methyl-5-[3-(o-fluorophenyl)ureido]-isoxazole.
7. 4-chloro-3-methyl-5-(3-phenylureido)isoxazole.

References Cited

UNITED STATES PATENTS 3,133,078   5/1964   Steiger _____ 260—307

ALEX MAZEL, Primary Examiner

R. V. RUSH, Assistant Examiner

U.S. Cl. X.R.

71—88